Sept. 2, 1941. A. W. HANSEN ET AL 2,254,741
METHOD OF MAKING HEAT RESISTING YARN AND CORD, AND THE CORD
Filed March 13, 1940

INVENTORS
ALBERT W. HANSEN AND
BY WILLIAM F. GUINAN
Chapin & Neal
ATTORNEYS

Patented Sept. 2, 1941

2,254,741

UNITED STATES PATENT OFFICE 2,254,741

METHOD OF MAKING HEAT RESISTING YARN AND CORD, AND THE CORD

Albert W. Hansen, Springfield, and William F. Guinan, Northampton, Mass., assignors to United States Rubber Company, New York, N. Y., a corporation of New Jersey, and Hampton Company, Easthampton, Mass., a corporation of Massachusetts, jointly Application March 13, 1940, Serial No. 323,705

36 Claims. (Cl. 57—139)

Our invention relates to the construction of a cord for use in the reenforcement of rubber articles generally and pneumatic tire casings in particular. This application is a continuation in part of our copending application Serial No. 236,062, filed October 20, 1938.

One object of our invention is the provision of a cord for the above purposes which shall be resistant to high operating temperatures and at the same time possess the properties of flexibility and resistance to fatigue, a combination of properties particularly desirable in pneumatic tire casings, belts, and belting.

A further object is the provision of a method of making such a cord.

Other and further objects residing in details of construction and method will be made apparent in the following specification and claims.

Cotton is the material most generally used in constructing cords for tire manufacture. Ordinary cotton cord, which has a normal moisture content of between 6% and 7%, has the disadvantage that as it loses its normal moisture content its tensile strength rapidly diminishes. Conventional cotton cord when bone dry loses from 30% to 40% of its tensile strength as compared with its strength when containing its normal moisture content. In truck and bus service, the high speeds and heavy loads now commonly encountered result in operating temperatures in the tire carcass which have the effect of driving the moisture from the cord, and this has caused the art to turn to other materials, such as rayon. Rayon increases in tensile strength as its moisture content diminishes, a property which renders it capable of withstanding the high operating temperatures which, because of their drying action, are destructive to ordinary cotton cords. Rayon has many disadvantages, however, as compared with cotton, among which may be mentioned its high cost relative to cotton, its relatively high ductility which results in a tendency for tires made from it to "grow," its poor natural adhesion to rubber necessitating costly treatments to increase its adhesion to rubber, and the fact that its strength rapidly diminishes when subjected to excess moisture, resulting in tire failure when water is permitted to enter a rayon tire carcass through a cut in, or the abrasive wear of, the tire tread, whereas cotton increases in strength when wet.

We have found that when cotton in a yarn form is subjected under substantial tension to the action of a concentrated caustic alkali, such as caustic soda or other strong hydroxide, or to any of the equivalent acid or caustic treatments which result in hydration of the unregenerated cellulose, that the heat resisting properties of cords made therefrom are substantially increased and that such a yarn may be twisted into a cord construction in a manner to obviate or compensate for any increased brittleness imparted to the cotton fiber by the caustic alkali treatment.

The caustic alkali or equivalent treatment to which we subject the yarns is a mercerizing process, in the commercial, chemical and mechanical significance of that term, but whereas the usual purpose of mercerization is to impart luster to the yarn, we employ the process for the heat resisting effect which we have found it imparts to the cotton. We, therefore, change or adjust all elements of the mercerizing process to secure the maximum of heat resistance, consistent with securing the other desirable properties in a tire cord, without reference to the presence or absence of luster. For example, by the substantial tension above mentioned we mean in excess of that necessary merely to produce a luster, although luster may be present. We have also found that with the preferred higher tensions the temperature of the wash water should be lowered; for example, if for ordinary mercerizing purposes the temperature of the wash water is around 160° F., we employ a wash water temperature around 120° F., a decrease of 25%.

The yarn hydrated with our purposes in view, appears somewhat ragged and its dyeing properties are impaired in that it dyes light, features which are undesirable in mercerized yarn for ordinary uses and indicative of our independence of, and departure from, usual mercerizing standards and practice.

We are aware that the use of conventionally mercerized fabrics in tires has been suggested for various purposes such as securing better rubber impregnation. We believe, however, that we are the first to recognize that a mercerizing or similar process properly carried out imparts heat resisting qualities to cotton and to propose a cord construction by which those qualities of a mercerized cotton may be utilized.

Figure 1:
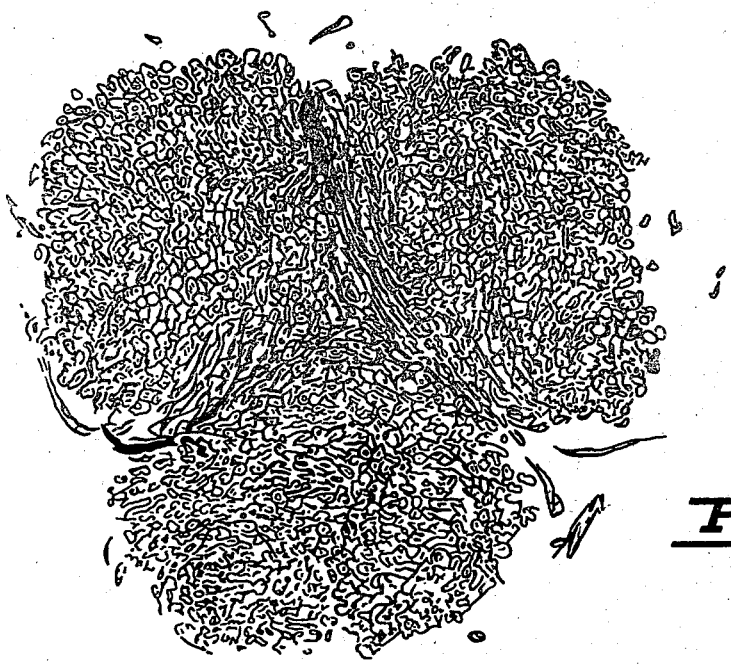
Fig. 1 is a drawing from a photomicrograph showing a cross-section of a cord embodying our invention enlarged approximately 200 diameters.

The treatment of cotton yarns according to our invention can be carried out with ordinary yarn mercerizing equipment, modified if necessary to permit of subjecting the yarn during mercerization to the desired tension. Preferably the entire hydrating process from the first preliminary steps, such as wetting, through the final drying steps, is carried out without release of the tension during or between the various steps, and as a continuous operation with the yarns in a warp formation or bundles of warps, as by the use of a so-called warp mercerizing machine. Preferably the tension is built up by increments during the various steps of the hydrating process to give the processed yarn the desired per cent of elongation. When a skein mercerizing machine is used the stretching tension is usually released between steps. As seen by a comparison of Tables I and III, with Table II, tests indicate a higher bone dry strength efficiency for the continuous operation. Similarly, the constitution of the caustic bath, the neutralizing bath, and the sequence of these with the washing operations may follow the usual mercerizing practice with such alterations as may be later indicated or which will be apparent to the skilled mercerizing technician from the present specification. For convenience we use the term mercerization in the following discussion, as applied to our treatment of cotton yarns, but it will be understood that the term as so used is to be construed as subject to the limitations and distinctions above pointed out.

In a similar manner we employ the term unregenerated hydrated cellulose to indicate the nature of cotton entering into our cord construction, that is, cotton whose cellulose has been modified in a manner characteristic of the action thereon of a strong hydroxide such as caustic soda or by equivalent treatments, some of the physical manifestations of which are a removal of the gums and waxes and a swelling of the cellulose.

In carrying out our invention the first step is a mercerizing treatment of the cotton in a yarn form under substantial tension. The tension may be varied over a substantial range, but from the viewpoint of conventional mercerizing practice it is preferably high. Considering tension in terms of stretch, satisfactory results have been obtained by applying sufficient tension on the yarn during mercerization to increase its length by 5% or more. However, reasonably satisfactory results have been obtained with lower tensions by which the yarn length is increased by 1% or less. In general, the best results are secured by tensions of the higher order.

Obviously the tension applied cannot exceed the total strain capacity of the yarn and such capacity will vary with such factors as the kind, quality, and staple length of the fibers from which the yarn is made. The actual figures given in the following tables are, therefore, illustrative only.

The following table is indicative of the effect of various tensions on the bone dry strength efficiency of the finished cord, zero stretch being rated as 100%:

TABLE I

*Skein mercerized*

| Tension during hydration in terms of stretch imparted to the yarn | Bone dry strength efficiency | Rating |
|---|---|---|
| | | Percent |
| 0 | 18.28 | 100 |
| 1.47% | 27.32 | 149 |
| 5.61% | 28.56 | 156 |
| 8.82% | 30.58 | 167 |
| 13.2% | 33.76 | 184 |

For proper mercerizing treatment, for our purposes, the yarn must be soft or loosely twisted to permit as nearly complete a penetration of the mercerizing liquids as is practical, and the range of tensions indicated above as being desirable is above that which a single yarn so twisted can stand. For that reason, among others, we carry our the mercerizing step with the yarn in multi-ply form, and employ for a 30$^s$ yarn, for example, 18 turns of twist in the single yarn and 11 to 12 turns of reverse twist in the ply. These limitations, imposed by the mercerizing process we employ, complicate the subsequent construction of the yarns into a tire cord, since the twists suitable for such mercerizing are usually unsatisfactory in a tire cord construction. We propose two general procedures in meeting these complications. According to the first, we mercerize a multi-ply yarn and employ an additional plying operation in the construction of the cord. For example, we may mercerize a 30 s/2 yarn, ply 3 of these yarns to form a 30 s/2/3 for the cable ply, and cable three of these together to form a 30 s/2/3/3 cord construction, that is a 3-ply cable, each ply of which consists of 3 plies of a 2-ply 30$^s$ yarn.

In following the second procedure we mercerize a multi-ply yarn containing the number of plies desired in the cable ply. To meet the mercerizing requirement that the yarn and ply twist must be low enough to permit thorough liquid penetration during the mercerization, only a portion of the desired yarn and ply twist is imparted prior to mercerization, and the multi-ply yarn is retwisted after mercerization to bring the ply twist to the desired character, both as to amount and direction. For example, we may mercerize a soft, loosely twisted, 12 s/4 yarn and, after retwisting it to the desired amount, cable 2 of the multi-ply yarns to form a 12 s/4/2 construction,—that is a 2-ply cable, each ply of which is made up of 4 plies of 12 s yarn.

By the procedures above given, a wide range of cord constructions may be made.

Figure 2:
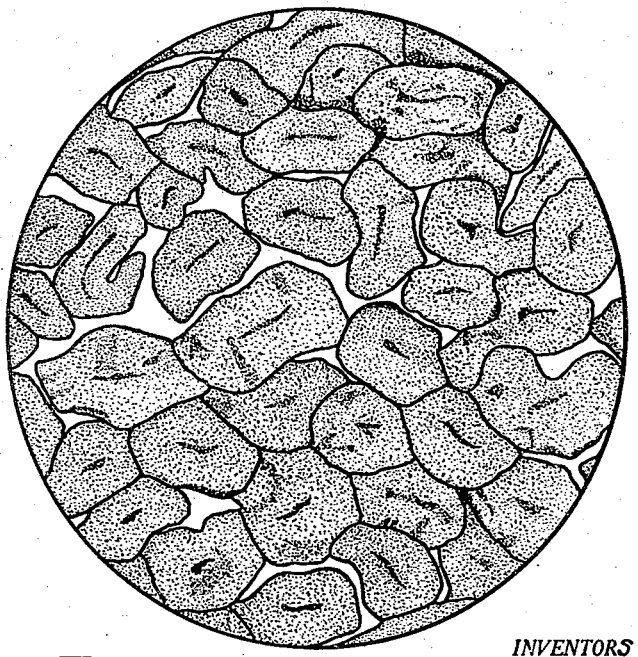
Fig. 2 is a drawing from a photomicrograph showing a further enlargement (approximately 1900 diameters) of a portion of a cross-section of a cord such as shown in Fig. 1.

As previously stated, the multi-ply yarn must be soft and loosely twisted at the time of mercerization; that is, the number of turns of yarn twist and ply twist are low. It should be borne in mind that the degree of twist and in some cases the direction of twist originally given the yarn will be altered by the subsequent ply twisting, and both yarn and ply twist will be altered by the cable twisting. In other words, the "residual" yarn and ply twists in the finished cord may be different in degree and/or direction from the "manufacturing" twists originally given them. We take advantage of this in both procedures above outlined to secure on the one hand a twist condition in the multi-ply yarn desirable for mercerization, and on the other hand the desired twist condition in the finished cord. For example, in a 12 s/4/2 construction such as referred to above—using the symbols s and z to indicate the direction of twist and indicating the degree of twist in turns per inch—we may give the single yarn 10 turns of s twist and ply four such yarns together with 6 turns of z twist which will leave a residual twist of 4 turns of s in the single yarns. Under these twist conditions the four-ply yarn is sufficiently soft and loose for thorough mercerization. After mercerizing the four-ply yarn may be given 24 additional turns of s twist which have the effect of increasing the single twist to 28 turns of s twist, while changing the ply twist from 6 z to 18 turns of s twist. We may now cable two of these four-ply yarns together, using 10.5 turns of z twist, with the result that the yarn and ply twists are further changed so that the final twist relationship is (single yarns twist 17.5 s), (ply twist 7.5 s), (cable twist 10.5 z). It ural cotton and a swelling of the fibers, both of which result in an increase in the frictional resistance of the fibers to slippage. The moisture regain at 65% relative humidity and 70° F. is increased to 8% or more. The tensioning of the yarn during hydration, preferably to a degree which imparts a permanent elongation or stretch to the cord, tends both to bring the fibers into closer and more intimate frictional contact and to bring the fibers into parallelism. The extreme density of our cord is apparent from Fig. 1, which is a cross-section of a 30s/2/3/3 cord embodying our invention. The yarn plies and intermediate plies are substantially indiscernible. In Fig. 2 the close engagement of the hydrated fibers and their wide surface contact are clearly evident.

The following table is indicative of some of the physical characteristics of our cord.

TABLE II

|  | A | B | C | D | E | F |
| --- | --- | --- | --- | --- | --- | --- |
| Construction | 30s/2/3/3 | 30s/2/3/3 | 30s/2/3/3 | 275/4/3 | 23/5/3 | 30s/2/3/3 |
| Fiber length | 1⅛" | 1⅛" | 1⁵⁄₁₆" | Continuous | 1⁵⁄₁₆" | 1⅛" |
| Cord gauge | .030 | .0285 | .0275 | .028 | .0349 | .0275 |
| Cord size normal [1] | 1.345 | 1.457 | 1.519 | 1.35 | 1.21 | 1.426 |
| Cord size bone dry | 1.453 | 1.574 | 1.641 | 1.51 | 1.29 | 1.540 |
| Tensile normal [1] | 19.9 | 21.4 | 23.2 | 20.3 | 19.76 | 19.3 |
| Tensile bone dry | 18.9 | 21.2 | 22.9 | 24.6 | 14.8 | 20.0 |
| Strength efficiency normal [1] | 26.71 | 31.18 | 35.24 | 27.45 | 23.87 | 27.52 |
| Strength efficiency bone dry | 27.47 | 32.97 | 37.88 | 37.2 | 19.06 | 31.06 |
| Stretch at 10 lbs. normal [1] | 8.52% | 6.8% | 6.6% | 7.5% | 15.04% | 4.1% |

[1] Normal 6–7% moisture regain at 65% R. H. at 70° F. for natural cotton cord. Normal 8–8.5% moisture regain at 65% R. H. at 70° F. for unregenerated hydrated cellulose cord. Normal 12% moisture regain at 65% R. H. at 70° F. for rayon cord.

Note.—Mercerizing carried out on a warp machine.

will be understood that for the sake of simplicity the twists in the above illustration have been given in round numbers and certain factors, such as friction and bending of the fibers, which in practice render the additions and subtractions of twists close approximations rather than exact as given above, have been ignored. This is believed sufficient to illustrate the procedure by which we meet the conflicting twist requirements of the mercerizing processes and tire cord construction. It might be pointed out that in the 30 s/2/3/3 construction, above referred to, by suitable selection of the twists subsequent to mercerization, the original singles yarn twist can be removed so that the 30 s/2/3/3 becomes in effect a 15 s/3/3.

We have found that cords thus made from unregenerated hydrated cellulose not only retain their tensile strength when deprived of their normal moisture content, but in fact show an increase in tensile strength when tested in a bone dry condition as compared with their strength when tested with a normal moisture content. While the increase in tensile strength is less in degree than that of rayon under similar conditions, it is sufficient to protect the cord against failure under the high operating temperatures encountered in truck and bus service. While we have also found that cords made according to our invention tend to lose their strength when subjected to excessive moisture, this loss is less in degree than is the case with rayon. The adhesion of rubber to cords made according to our invention equals or excels the adhesion of rubber to conventional cotton cords.

The structural characteristics of our cord resulting from the chemical and mechanical treatment to which we subject the fibers of the yarn and the yarn itself are reflected in the novel physical properties of the finished cord.

The hydration of the cellulose fibers results in a removal of the gums and waxes of the nat- Cord A in the above table was formed from a two-ply 30s hydrated unregenerated cellulose yarn the hydration being carried out under tension which imposed a 1% stretch on the yarns. Cord B was constructed in a similar manner from the same grade of yarn but hydrated under a tension which imposed a 5% stretch on the yarns. Cord C differed from cord B only in the use of a longer staple cotton. It will be noted that in each case the normal and bone dry tensiles of the hydrated unregenerated cellulose cord are substantially the same, whereas there is a substantial drop in the tensile of natural cotton cord under bone dry conditions as shown under E. It will also be noted that the strength efficiency bone dry of the hydrated unregenerated cellulose cord is not only high in value, but higher than the normal strength efficiency, which relationship is the reverse of natural cotton. In any case the stretch of the unregenerated hydrated cellulose cord at 10 lbs. load is low, when compared with that of a natural cotton cord of comparable construction as indicated in Tables II and III.

Figure 3:
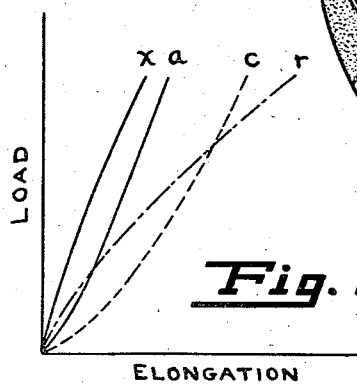
Fig. 3 is a graph showing the stress-strain characteristics of a cord embodying our invention when tested under normal moisture conditions.

A further novel characteristic of our cord is found in the character of its stress-strain curve when its stretch at 10 lbs. load (normal) is lowered appreciably below 5%. At a in Fig. 3 is shown the type of stress-strain curve exhibited by our cord when possessing a stretch at 10 lbs. normal, approximating that of cords A, B, and C in Table II. It will be noted that with respect to its direction of concavity curve a is similar to that of a natural cotton cord, the curve of which is shown in dotted line at c; that is, the curvature is concave upwardly. When however, the stretch of our cord at 10 lbs. normal is somewhat reduced, as in cord F of Table II, the curvature of its stress-strain curve is reversed as shown at x in Fig. 3, becoming concave downwardly and is thus similar, with respect to the direction of its concavity, to the stress-strain curve of rayon which is shown in dot-dash line at $r$. The reduction of stretch in our cord to effect this reversal may be brought about in various ways, as by twisting under tension, as was done in the case of cord F in Table II; by stretching the finished cord either before it is built into a tire or during such building; or by the strains imposed on the cord in the initial use of the tire; or by a combination of such means. Cords such as A, B, and C of Table II, for example, when built into a tire and subjected to working strains will, upon removal from the tire, shown a downwardly concave stress-strain curve such as shown at $x$ in Fig. 3. It will be understood that the point of reversal of curvature cannot be determined exactly because of the many variations that enter into the numerous manufacturing operations and the materials involved. In general the reversal will take place when the stretch at 10 lbs. normal is appreciably below 5%, as for example the 4.1% stretch of cord F in Table II.

For a given cord made according to our invention the stretch at 10 lbs. normal will be lower, the higher the stretch imposed on the two-ply yarn during hydration. In general we find that any cord constructed in accordance with our invention from a multiple yarn hydrated under stretching tension will show a downwardly concave stress-strain curve when subjected to working strains, including in the latter term the strain incident to building the cord into a tire. The direction of curvature of the stress-strain curve of a natural cotton cord, as far as we have been able to determine, cannot be reversed by lowering its stretch.

The graphs of Fig. 3 and the above tables indicate that mercerizing, or otherwise hydrating, the unregenerated cellulose of the natural cotton, in yarn form and under a stretching tension, imparted to our cord some of the advantageous properties of continuous filament rayon while obtaining the advantages of a relatively high wet strength which rayon does not have.

The extent to which some of the results we obtain are due to the hydration of the unregenerated cellulose, under stretching tension, is clearly indicated by the following table which shows the test results, and analysis of, two cords G and H identical in construction and treatment except for the fact that in the treatment of these cords, H was immersed in water containing a penetrant in lieu of the hydrating caustic solution to which cord G was subjected. The treatment in both cases was carried out on a skein mercerizing machine and under a tension which imparted a 5% stretch to the yarn.

TABLE III

Skein mercerized

| | G | H |
|---|---|---|
| Construction | 30°/2/3/3 | 30°/2/3/3 |
| Cord size | 1.372 | 1.338 |
| Cord gauge | .0305 | .031 |
| Tensile normal | 18.5 | 17.3 |
| Tensile bone dry | 18.0 | 13.6 |
| Strength efficiency—normal | 25.38 | 23.15 |
| Strength efficiency—bone dry | 26.86 | 19.48 |
| Bone dry efficiency_____percent | 97.30 | 78.61 |
| Stretch at 10 lbs.—normal____do | 9.9 | 13.0 |
| Stretch at 10 lbs.—bone dry___do | 6.5 | 9.5 |
| Single twist | 16.66 | 17.22 |
| 30/2 ply twist | 11.13 | 11.51 |
| 30/2/3 ply twist | 21.84 | 21.48 |
| Cable twist | 11.86 | 11.83 |

The above results indicate that, in the construction given, the hydration of the yarns has increased the strength efficiency of the cord by 9.6% when taken on a normal moisture basis, and by 37.8% when taken on a bone dry basis. The cord is reduced in size approximately 2.5%, and in gauge .0005 or 1.7%. The stretch under the above conditions is decreased from 13.0% to 9.9%.

It will be understood that our invention is not limited to any specific twist combination and that we are able to take advantage of the full range of twist combinations to secure, as may be desired, those cord properties which are dependent on twist.

We claim:

1. The method of treating unregenerated cellulose yarns for use in tire cords and the like which comprises hydrating the cellulose of the yarns while subjecting the yarns to sufficient tension to effect a permanent elongation thereof.

2. The method of treating unregenerated cellulose yarns for use in tire cords and the like which comprises hydrating the cellulose of the yarns while subjecting the yarns to sufficient tension to effect a permanent elongation thereof, the yarns being held under tension throughout the treatment and until dry.

3. The method of treating unregenerated cellulose yarns for use in tire cords or the like which comprises hydrating the cellulose of the yarns while subjecting the yarns to sufficient tension to effect substantially 5% permanent elongation of the yarns.

4. The method of treating unregenerated cellulose yarns for use in tire cords or the like which comprises hydrating the cellulose of the yarns while subjecting the yarns to sufficient tension to effect the maximum permanent elongation of the yarns short of rupture.

5. The method of treating unregenerated cellulose yarns for use in tire cords or the like which comprises hydrating the cellulose of the yarns while subjecting the yarns to sufficient tension to effect substantially 5% permanent elongation of the yarns, the yarns being held under tension throughout the treatment and until dry.

6. The method of treating unregenerated cellulose yarns for use in tire cords or the like which comprises hydrating the yarns in the form of a warp and subjecting the warp during the treatment to sufficient tension to effect a permanent elongation of the yarns.

7. The method of treating unregenerated cellulose yarns for use in tire cords or the like which comprises hydrating the yarns in the form of a warp and subjecting the warp during the treatment to sufficient tension to effect a permanent elongation of the yarns of at least substantially 5%.

8. The method of treating unregenerated cellulose yarns for use in tire cords or the like which comprises hydrating the yarns in the form of a warp and subjecting the warp during the treatment to sufficient tension to effect a permanent elongation of the yarns of at least substantially 5%, the warp being maintained under tension throughout the treatment and until dry.

9. The method of constructing a cord which comprises treating unregenerated cellulose yarns, under tension, to remove the oils and waxes from the fibers, twisting together a plurality of so treated yarns to form a cord, and subjecting the cord and its constituent parts to sufficient tension, including the tension imposed on the yarns during treatment, to impart to the cord a stretch at 10 lbs. load of approximately 5%.

10. The method of constructing a cord which comprises hydrating unregenerated cellulose yarns under tension, twisting together a plurality of so treated yarns to form a cord, and subjecting the cord and its constituent parts to sufficient tension, including the tension imposed on the yarns during treatment, to impart to the cord a stretch at 10 lbs. load of approximately 5%.

11. The method of constructing a cord which comprises hydrating unregenerated cellulose yarns under tension, twisting together a plurality of so treated yarns to form a cord, and subjecting the cord and its constituent parts to sufficient tension, including the tension imposed on the yarns during hydration, to impart to the cord a stress-strain curve concave downwardly at stretches appreciably below 5% at 10 lbs. load.

12. The method of constructing a cord which comprises hydrating unregenerated cellulose yarns in the form of a warp, the warp being maintained under tension throughout the hydrating treatment and until dry, twisting together a plurality of so treated yarns to form a cord, and subjecting the cord and its constituent parts to sufficient tension, including the tension imposed on the yarns during hydration, to impart to the cord a stress-strain curve concave downwardly at stretches appreciably below 5% at 10 lbs. load.

13. The method of constructing a cord for use in pneumatic tire casings and the like which comprises loosely twisting together a plurality of single cotton yarns to form a multi-ply yarn, hydrating the so-formed multi-ply yarn, and thereafter twisting a plurality of the so hydrated yarns into the form of a cabled cord.

14. The method of constructing a cord for use in pneumatic tire casings and the like which comprises loosely twisting together a plurality of single cotton yarns to form a multi-ply yarn, hydrating the so formed multi-ply yarn under tension in excess of that which a single yarn is capable of withstanding, and thereafter twisting a plurality of the so hydrated yarns into the form of a cabled cord.

15. The method of constructing a cord for use in pneumatic tire casings and the like which comprises loosely twisting together a plurality of single cotton yarns to form a multi-ply yarn, hydrating the so formed multi-ply yarn, twisting together a plurality of the so hydrated yarns into an intermediate ply, and finally twisting together a plurality of said intermediate plies to form the finished cabled cord.

16. The method of constructing a cord for use in pneumatic tire casings and the like which comprises loosely twisting together a plurality of single cotton yarns to form a multi-ply yarn, hydrating the so formed multi-ply yarn, re-twisting the so hydrated multi-ply yarn to change its degree of ply twist and finally twisting a plurality of the re-twisted yarns into the form of a cable cord.

17. The method of constructing a cord for use in pneumatic tire casings and the like which comprises loosely twisting together a plurality of single cotton yarns to form a multi-ply yarn, mercerizing the so formed multi-ply yarn, and thereafter twisting a plurality of the so mercerized yarns into the form of a cabled cord.

18. The method of constructing a cord for use in pneumatic tire casings and the like which comprises loosely twisting together a plurality of single cotton yarns to form a multi-ply yarn, mercerizing the so formed multi-ply yarn under tension in excess of that which a single yarn is capable of withstanding, and thereafter twisting a plurality of the so mercerized yarns into the form of a cabled cord.

19. The method of constructing a cord for use in pneumatic tire casings and the like which comprises loosely twisting together a plurality of single cotton yarns to form a multi-ply yarn, mercerizing the so formed multi-ply yarn, twisting together a plurality of the so mercerized yarns into an intermediate ply, and finally twisting together a plurality of said intermediate plies to form the finished cabled cord.

20. The method of constructing a cord for use in pneumatic tire casings and the like which comprises loosely twisting together a plurality of single cotton yarns to form a multi-ply yarn, mercerizing the so formed multi-ply yarn, re-twisting the so mercerized multi-ply yarn to change its degree of ply twist and finally twisting a plurality of the re-twisted yarns into the form of a cabled cord.

21. The method of constructing a cord, for use in pneumatic tire casings and the like, which comprises loosely twisting together a plurality of single unregenerated cellulose fiber yarns to form a multi-ply yarn, removing the oils and waxes from the fibers and swelling the cellulose thereof by mercerizing the so formed yarns while subjecting the yarns to sufficient tension to effect a permanent elongation of the yarns and thereafter twisting together a plurality of the so treated yarns to form a cord having the desired twist characteristics.

22. The method of constructing a cord, for use in pneumatic tire casings and the like, which comprises loosely twisting together a plurality of single unregenerated cellulose fiber yarns to form a multi-ply yarn, removing the oils and waxes from the fibers and swelling the cellulose thereof by mercerizing the so formed yarns while subjecting the yarns to sufficient tension to effect a permanent elongation of the yarns at least equal to 5% of their original length and thereafter twisting together a plurality of the so treated yarns to form a cord having the desired twist characteristics.

23. The method of constructing a cord, for use in pneumatic tire casings which comprises loosely twisting together a plurality of unregenerated cellulose fiber yarns to form a multi-ply yarn, removing the oils and waxes from the fibers and swelling the cellulose thereof by mercerizing the so formed yarns while subjecting the yarns to sufficient tension to effect the maximum permissible permanent elongation of the yarns, the yarn being held under tension through the mercerizing treatment and until dry, and thereafter twisting together a plurality of the so treated yarns to form a cord having the desired twist characteristics.

24. An unregenerated cellulose yarn for use in tire cords and the like, said yarn being substantially identical with the product produced by the method of claim 1.

25. An unregenerated cellulose yarn for use in tire cords and the like, said yarn being substantially identical with the product produced by the method of claim 2.

26. An unregenerated cellulose yarn for use in tire cords and the like, said yarn being substantially identical with the product produced by the method of claim 3.

27. An unregenerated cellulose yarn for use in tire cords and the like, said yarn being substantially identical with the product produced by the method of claim 4.

28. An unregenerated cellulose yarn for use in tire cords and the like, said yarn being substantially identical with the product produced by the method of claim 7.

29. A cord constructed of unregenerated cellulose yarns, said cord being substantially identical with the product produced by the method of claim 9, and having a stretch at ten pounds load of approximately five per cent.

30. A cord for use in pneumatic tire casings and the like, said cord being substantially identical with the product produced by the method of claim 13.

31. A cord for use in pneumatic tire casings and the like, said cord being substantially identical with the product produced by the method of claim 14.

32. A cord for use in pneumatic tire casings and the like, said cord being substantially identical with the product produced by the method of claim 15.

33. A cord for use in pneumatic tire casings and the like, said cord being substantialy identical with the product produced by the method of claim 16.

34. A cord for use in pneumatic tire casings and the like, said cord being substantially identical with the product produced by the method of claim 21.

35. A cord for use in pneumatic tire casings and the like, said cord being substantially identical with the product produced by the method of claim 22.

36. A cord for use in pneumatic tire casings and the like, said cord being substantially identical with the product produced by the method of claim 23.

ALBERT W. HANSEN.
WILLIAM F. GUINAN.